US009823430B2

(12) United States Patent
Amirkiai et al.

(10) Patent No.: US 9,823,430 B2
(45) Date of Patent: Nov. 21, 2017

(54) LENS RECEPTACLES (71) Applicant: FINISAR CORPORATION, Sunnyvale, CA (US)

(72) Inventors: Maziar Amirkiai, Sunnyvale, CA (US); Tao Wu, Union City, CA (US); Mark Donovan, Mountain View, CA (US); Hongyu Deng, Saratoga, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 36 days.

(21) Appl. No.: 14/831,499

(22) Filed: Aug. 20, 2015

(65) Prior Publication Data
US 2016/0047996 A1 Feb. 18, 2016

Related U.S. Application Data (63) Continuation of application No. 14/824,883, filed on Aug. 12, 2015.
(Continued)

(51) Int. Cl.
*G02B 6/32* (2006.01)
*G02B 6/36* (2006.01)
(Continued)

(52) U.S. Cl.
CPC .......... *G02B 6/4212* (2013.01); *G02B 6/423* (2013.01); *G02B 6/4204* (2013.01);
(Continued)

(58) Field of Classification Search
CPC .. G02B 6/3861; G02B 6/3874; G02B 6/4212; G02B 6/4231; G02B 6/4246;
(Continued)

(56) References Cited

U.S. PATENT DOCUMENTS 5,107,537 A * 4/1992 Schriks ................ G02B 6/4204
385/91
5,257,336 A * 10/1993 Dautartas ............. G02B 6/4204
385/93
(Continued)

FOREIGN PATENT DOCUMENTS

JP  271882 A * 10/2007 ............... G02B 6/42

OTHER PUBLICATIONS

International Search Report and Written Opinion for PCT Application No. PCT/US2015/057883 dated Dec. 23, 2015.

*Primary Examiner* — Akm Enayet Ullah
(74) *Attorney, Agent, or Firm* — Maschoff Brennan (57) ABSTRACT

This disclosure generally relates to high-speed fiber optic networks that use light signals to transmit data over a network. The disclosed subject matter includes devices and methods relating to lens receptacles and/or optoelectronic subassemblies. In some aspects, the disclosed devices and methods relate to a lens receptacle including a receptacle body extending between a receptacle top and a receptacle bottom, the receptacle body including: a port body defining a receptacle port with a port opening at the receptacle top; a receptacle window defining a base of the receptacle port; a lens array including lenses positioned on the receptacle window; and at least one receptacle alignment feature.

14 Claims, 7 Drawing Sheets

Related U.S. Application Data (60) Provisional application No. 62/036,714, filed on Aug. 13, 2014, provisional application No. 62/039,758, filed on Aug. 20, 2014, provisional application No. 62/063,225, filed on Oct. 13, 2014, provisional application No. 62/069,707, filed on Oct. 28, 2014, provisional application No. 62/069,710, filed on Oct. 28, 2014, provisional application No. 62/069,712, filed on Oct. 28, 2014.

(51) Int. Cl.
*G02B 6/38* (2006.01)
*G02B 6/42* (2006.01)

(52) U.S. Cl.
CPC ......... *G02B 6/4231* (2013.01); *G02B 6/4246* (2013.01); *G02B 6/4249* (2013.01); *G02B 6/4251* (2013.01); *G02B 6/325* (2013.01); *G02B 6/3636* (2013.01); *G02B 6/3858* (2013.01); *G02B 6/3861* (2013.01); *G02B 6/3874* (2013.01)

(58) Field of Classification Search
CPC .... G02B 6/4249; G02B 6/325; G02B 6/3636; G02B 6/3858
USPC .................... 385/14, 24, 37–43, 88–99, 147
See application file for complete search history.

(56) References Cited

U.S. PATENT DOCUMENTS

| | | | | |
|---|---|---|---|---|
| 5,586,207 | A * | 12/1996 | Goodwin | G02B 6/4292 385/120 |
| 6,243,508 | B1 * | 6/2001 | Jewell | G02B 6/4206 385/14 |
| 7,118,292 | B2 * | 10/2006 | Miao | G02B 6/4246 385/88 |
| 8,888,380 | B2 * | 11/2014 | Hung | G02B 6/43 385/89 |
| 2001/0024551 | A1 | 9/2001 | Yonemura et al. | |
| 2001/0051026 | A1 | 12/2001 | Steinberg et al. | |
| 2003/0103740 | A1 * | 6/2003 | Edwards | G02B 6/4292 385/94 |
| 2003/0138219 | A1 * | 7/2003 | O'Toole | G02B 6/4214 385/92 |
| 2004/0151505 | A1 * | 8/2004 | Aronson | H01S 5/02212 398/138 |
| 2004/0163836 | A1 * | 8/2004 | Kumar | H01S 5/02212 174/50 |
| 2004/0264884 | A1 * | 12/2004 | Liu | G02B 6/42 385/89 |
| 2005/0202826 | A1 * | 9/2005 | Yuang | G02B 7/022 455/450 |
| 2005/0259916 | A1 * | 11/2005 | Jenkins | G02B 6/4206 385/31 |
| 2006/0034571 | A1 * | 2/2006 | Nagano | G02B 6/3897 385/94 |
| 2014/0205246 | A1 | 7/2014 | Li et al. | |

* cited by examiner

LENS RECEPTACLES

CROSS-REFERENCE TO RELATED APPLICATIONS

This application is a continuation of patent application Ser. No. 14/824,883, filed Aug. 12, 2015, entitled FERRULE ASSEMBLIES, which claims priority to U.S. Provisional Application 62/036,714, filed Aug. 13, 2014, entitled FERRULE ASSEMBLIES, U.S. Provisional Application 62/039,758, filed Aug. 20, 2014, entitled LENS RECEPTACLES, U.S. Provisional Application 62/063,225, filed Oct. 13, 2014, entitled MULTI-LENS OPTICAL COMPONENTS, U.S. Provisional Application 62/069,707 filed Oct. 28, 2014, entitled MULTI-CHANNEL OPTOELECTRONIC SUBASSEMBLIES, U.S. Provisional Application 62/069,710 filed Oct. 28, 2014, entitled MULTI-LAYER SUBSTRATES, and U.S. Provisional Application 62/069,712 filed Oct. 28, 2014, entitled SUBSTRATES INCLUDING OPTOELECTRONIC COMPONENTS; which are all incorporated by reference herein in their entirety.

BACKGROUND

The present disclosure relates to high-speed fiber optic networks that use light signals to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

The claimed subject matter is not limited to configurations that solve any disadvantages or that operate only in environments such as those described above. This background is only provided to illustrate examples of where the present disclosure may be utilized.

SUMMARY

In one example, an optoelectronic subassembly includes: a lens receptacle including a receptacle body extending between a receptacle top and a receptacle bottom, the receptacle body including a port body defining a receptacle port at the receptacle top, a receptacle window defining a base of the receptacle port, a lens array including lenses positioned on the receptacle window, and at least one receptacle alignment feature; a multi-channel header subassembly; and a housing comprising a housing window that is at least partially optically transmissive.

In another example, a lens receptacle includes a receptacle body extending between a receptacle top and a receptacle bottom, the receptacle body including a port body defining a receptacle port with a port opening at the receptacle top, a receptacle window defining a base of the receptacle port, a lens array including lenses positioned on the receptacle window, and at least one receptacle alignment feature.

In yet another example, a method includes: providing a lens receptacle including a receptacle body extending between a receptacle top and a receptacle bottom, a port body defining a receptacle port, a receptacle window including a lens array of lenses positioned on the receptacle window, and at least one receptacle alignment feature; and providing a ferrule assembly including a ferrule body having upper and lower clamp members that retain optical fibers and at least one ferrule alignment feature configured to interface with the receptacle alignment feature.

This Summary is provided to introduce a selection of concepts in a simplified form that are further described below in the Detailed Description. This Summary is not intended to identify key features or essential characteristics of the disclosed subject matter, nor is it intended to be used as an aid in determining the scope of the claims. Additional features and advantages will be set forth in the description which follows, and in part will be obvious from the description, or may be learned by practice.

DETAILED DESCRIPTION

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The terms and words used in the following description and claims are not limited to the bibliographical meanings, but are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

In this disclosure the term "optoelectronic subassembly" may be used to refer to any portion of an optoelectronic assembly. However, at times this disclosure may use "optoelectronic subassembly" to refer to specific portions of an optoelectronic assembly, as may be indicated by context.

High-speed fiber optic networks use light signals (which may also be referred to as optical signals) to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

Although fiber optic networks use light signals to carry data, many electronic devices such as computers and other network devices use electrical signals. Accordingly, optoelectronic assemblies may be used to convert electrical signals to optical signals, convert optical signals to electrical signals, or convert both electrical signals to optical signals and optical signals to electrical signals.

Optoelectronic assemblies may include optoelectronic subassemblies ("OSAs"), such as receiver optoelectronic subassemblies ("ROSAs"), transmitter optoelectronic subassemblies ("TOSAs"), or both. A ROSA receives light signals with a light detector such as a photodiode and converts light signals into electrical signals. A TOSA receives electrical signals and transmits corresponding light signals. A TOSA may include an optical transmitter such as a laser that generates light that is transmitted through a fiber optic network.

Optoelectronic assemblies or subassemblies may include various components such as optical components and/or electronic components. Optical components involve optical signals and may, for example, emit, receive, transmit, carry, focus, and/or collimate optical signals. Electrical components involve electrical signals may, for example, receive, transmit, carry, transduce, transform, modulate, and/or amplify electronic signals. Optoelectronic components may involve both electrical and optical signals, and may be referred to as transducer components. Optoelectronic components may change optical signals to electrical signals and/or change electrical signals to optical signals (e.g., diodes or lasers).

Some optoelectronic assemblies may include multiple channels ("multi-channel optoelectronic assemblies"), with each channel corresponding to a set of one or more optical signals travelling through an optical fiber. Multi-channel optoelectronic assemblies may support increased data transfer rates through fiber optic networks. For example, a four channel optoelectronic assembly may be able to send and receive data at data transfer rates of approximately four times the data transfer rate of a comparable single channel optoelectronic assembly.

Ferrule assemblies may be used in fiber optic networks to physically and/or optically couple optical fibers with optoelectronic assemblies, optoelectronic subassemblies, optical components and/or electronic components. For example, ferrule assemblies may be used to couple ROSAs and/or TOSAs to optical fibers that are part of a fiber optic network thereby permitting the ROSA to receive optical signals and/or permitting the TOSA to transmit optical signals. Additionally or alternatively, ferrule assemblies may form part of an optoelectronic assembly or subassembly configured to transmit or receive electrical or optical signals in a fiber optic network.

Some optoelectronic assemblies may include hermetically sealed housings to protect components. However, space within hermetically sealed housings may be limited, especially if the optoelectronic assemblies comply with small form factor industry standards. Furthermore, increasing the size of hermetically sealed housings may increase the costs of producing optoelectronic assemblies. Conversely, decreasing the size of hermetically sealed housings may decrease the costs of producing optoelectronic assemblies.

Producing some hermetically sealing structures may increase the production costs of optoelectronic assemblies. In some circumstances, producing hermetically sealing structures with greater hermetically sealed portions may be more expensive than producing hermetically sealing structures with smaller hermetically sealed portions. Some hermetically sealing structures may add to the complexity of optoelectronic assemblies. Additionally or alternatively, some hermetically sealing structures may increase the size of optoelectronic assemblies.

Optoelectronic assemblies may need to comply with certain standards that may specify aspects of optoelectronic assemblies such as size, power handling, component interfaces, operating wavelengths or other specifications. Examples of such standards include CFP, XAUI, QSFP, QSFP+, XFP, SFP and GBIC. Complying with such standards may limit the structure, size, cost, performance or other aspects of optoelectronic assembly designs. Such standards may also limit configurations of components of optoelectronic assemblies such as receptacles that receive ferrule assemblies and/or hermetically sealing structures such as housings.

In some optoelectronic assemblies, electronic and/or radio frequency signal transmission lines ("RF lines") may couple lasers or other components of optoelectronic assemblies. The electrical performance of the RF lines ("RF performance" or "RF response") may be important to the operation of optoelectronic assemblies. Accurately controlling and/or reducing the dimensions of RF lines may contribute to optoelectronic assemblies with suitable and/or favorable RF performance. However, the design and positioning of components of optoelectronic assemblies may prevent the length of RF lines from being sufficiently controlled and/or minimized.

Components such as optoelectronic subassemblies or portions of optoelectronic subassemblies may be produced in large quantities and the produced components may need to comply with specifications that specify various aspects of the produced components (e.g., shape, dimensions and/or positioning). The produced components may include variations in the specifications. Some variation in specifications may be permitted because the produced components may be suitable or work properly. Some variations in specifications may result in components that are unsuitable. Tolerance may refer to an allowable amount of variation of a specification (e.g., dimension or positioning). Some specifications may have higher ("wider") or lower ("tighter") tolerance. For example, outside dimensions of optoelectronic subassemblies may have a wider tolerance because the variations may not affect the operation of the produced optoelectronic subassemblies. In another example, the positioning of optical components may require a tighter tolerance because the positioning affects the focus and/or transmission of optical signals. In yet another example, the dimensions of RF lines may require tighter tolerances because the dimensions may significantly affect RF performance.

The selected production processes may affect the prevalence and extent of the variations. In some circumstances the production processes may be controlled to increase or decrease the range of variation, the frequency of the variations, or other aspects. In some circumstances, producing components to tighter tolerances may increase production costs (or vice versa). For example, the tighter tolerance production processes may be more expensive than wider tolerance production processes. Tighter tolerance may result in more unsuitable components. Unsuitable components may be discarded without recovering production costs or repaired adding to production costs. Production processes may be modified to decrease or eliminate the production of unsuitable components, but in some circumstances this may increase costs.

FIGS. 1A-1D illustrate a lens receptacle 150 including a receptacle body 151 extending between a receptacle top 180 and a receptacle bottom 182. The receptacle body 151 may include a receptacle base 152 defining a receptacle cavity 184 positioned at or near the receptacle bottom 182. The receptacle body 151 may include a port body 194 defining a receptacle port 154 at or near the receptacle top 180. The lens receptacle 150 may include a lens array 158 including lenses 157 (only one of which is labeled in some of the figures for clarity). Some or all of the lenses 157 may be configured to convey and/or focus optical signals. The receptacle top 180 and the receptacle bottom 182 generally refer to portions of the lens receptacle 150 and are not limited to portions at or near the ends of the lens receptacle 150.

Figure 7A:
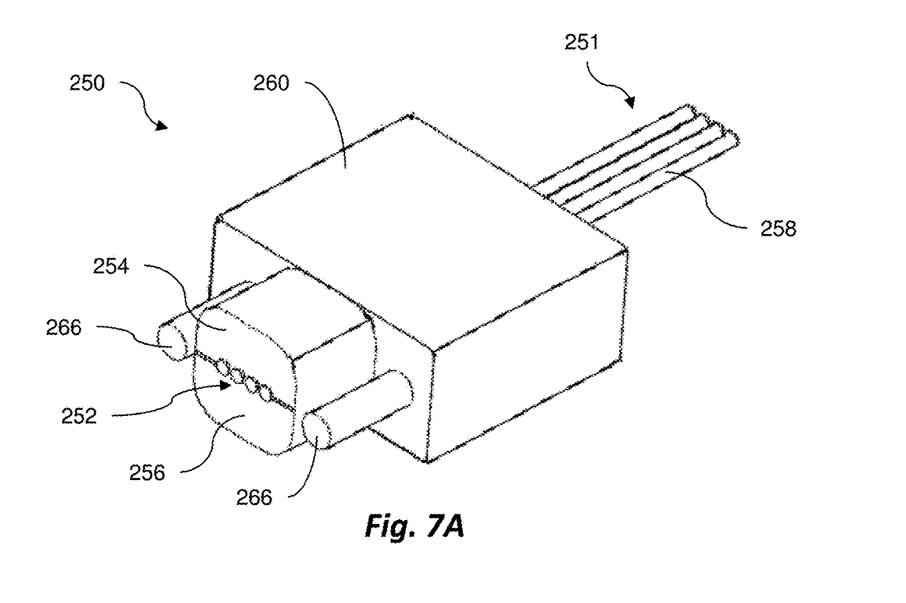
FIG. 7A is a perspective view of a ferrule assembly configured to interface with a lens receptacle.
Figure 7B:
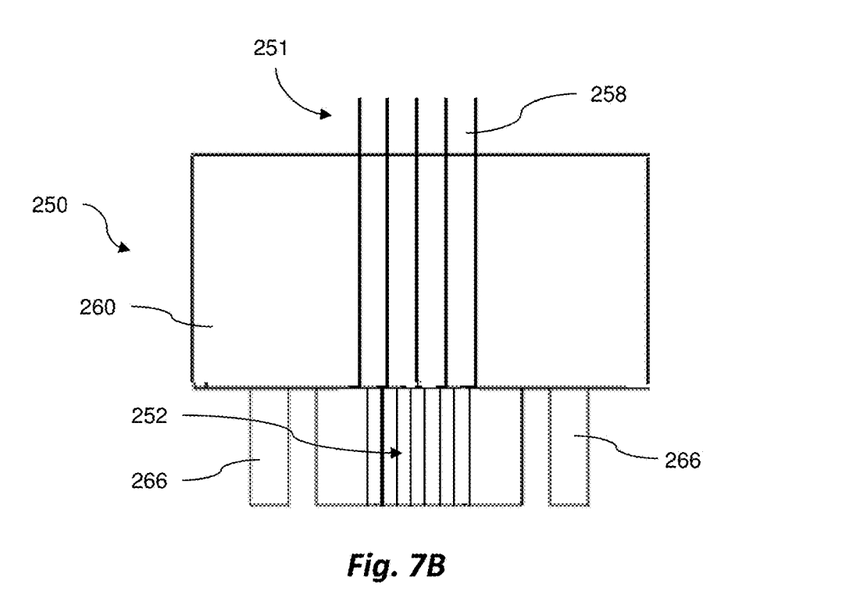
FIG. 7B is a cross-sectional side view of the ferrule assembly of FIG. 7A.

The receptacle port 154 may be configured (e.g., shaped and/or dimensioned) to receive a ferrule assembly such as a ferrule assembly 250 illustrated in FIGS. 7A-7B. The receptacle base 152 and/or the receptacle cavity 184 may be configured (e.g., shaped and/or dimensioned) to interface with other components such as housings and/or header assemblies. For example, the receptacle base 152 and/or the receptacle cavity 184 may be shaped and/or dimensioned to interface with a header subassembly 170 and or a housing 160 (see, for example, FIG. 3), both of which will be described in further detail below.

The receptacle body 151 may define an aperture 155 (or a light aperture 155) positioned within the receptacle port 154. As illustrated, for example, in FIGS. 1A and 1C, the aperture 155 may be configured (e.g., shaped and/or dimensioned) to permit optical signals to travel through at least a portion of the lens receptacle 150 to the lens array 158 and/or the lenses 157. Alternatively, the aperture 155 may be omitted and the receptacle port 154 may be configured (e.g., shaped and/or dimensioned) to permit optical signals to travel through at least a portion of the lens receptacle 150 to the lens array 158 and/or the lenses 157.

The receptacle body 151 may include an optically transmissive window such as a receptacle window 159 occluding the aperture 155. The receptacle window 159 may be integral to the receptacle body 151 or coupled to the receptacle body 151. The receptacle window 159 may define a base of the receptacle port 154. The lens array 158 may be positioned on the receptacle window 159 at or near the receptacle bottom 182 and/or within the receptacle cavity 184. All or some of the lenses 157 may be configured (e.g., shaped, dimensioned and/or positioned) to convey, direct and/or focus optical signals corresponding to one channel of a multi-channel subassembly, such as the header subassembly 170. All or some of the lenses 157 on the receptacle window 159 may be positioned on, coupled with, or integral to the receptacle window 159.

The lens receptacle 150 and/or the receptacle body 151 may include receptacle alignment features 156. As illustrated, the receptacle alignment features 156 may be defined by the receptacle body 151 and may be positioned within the receptacle port 154 (although other configurations will be described in further detail below). The receptacle alignment features 156 may be configured (e.g., shaped, dimensioned and/or positioned) to interface or facilitate aligning the ferrule assembly 250 with the lens receptacle 150 and/or the header subassembly 170. For example, the receptacle alignment features 156 may be configured (e.g., shaped, dimensioned and/or positioned) to receive corresponding ferrule alignment features 266 of the ferrule assembly 250 to facilitate alignment of the lens array 158 (e.g., one or more of the lenses 157) with corresponding optical fibers 252 of the ferrule assembly 250.

Certain aspects of the lens receptacle 150, which will be described in further detail below, may facilitate economical production of optoelectronic subassemblies with multiple channels ("multi-channel optoelectronic subassemblies"). Aspects of the lens receptacle 150 may contribute to decreased production costs for optoelectronic subassemblies that incorporate the lens receptacle 150. For example, some aspects of the lens receptacle 150 may simplify the production processes involving optoelectronic subassemblies. In another example, some aspects of the lens receptacle 150 may decrease the costs of the materials used to produce the lens receptacle 150 and/or optoelectronic subassemblies.

In some aspects, the entire lens receptacle 150 may include all or some of the described aspects of this disclosure and may be integrally formed by molding, machining, stamping, deposition, printing or any suitable technique. Integrally forming the lens receptacle 150 with all or some of the described aspects may facilitate cost-effective production of the lens receptacle 150 by decreasing material costs and/or production complexity. In some circumstances, the production technique may be chosen taking into consideration the cost of producing the lens receptacle 150 using that technique.

The lens receptacle 150 may be formed of any suitable material or materials. For example, at least a portion of the receptacle body 151 of the lens receptacle 150 may be formed of an optically transmissive material such as a plastic polymer, glass, or other optically transmissive material. In such circumstances, the portion of the lens receptacle 150 that is optically transmissive may correspond to the receptacle window 159, the aperture 155, the lenses 157, and/or the lens array 158 as well as the receptacle window 159. For example, the receptacle window 159 may be optically transmissive at least where the lenses 157 are positioned. In yet another example, the receptacle window 159 may be optically transmissive at least where the aperture 155 is positioned. In yet another example, the entire receptacle window 159 may be optically transmissive. In another example, the entire lens receptacle 150 (including the receptacle body 151) may be formed of an optically transmissive material such as a plastic polymer, glass, or other optically transmissive material. Forming all of the aspects and features of the lens receptacle 150 of a single optically transmissive material may facilitate cost-effective production of the lens receptacle 150 by decreasing material costs and/or production complexity.

In yet another aspect, the material used to form the lens receptacle 150 may be selected to contribute to cost-effective production of optoelectronic subassemblies. For example, the material selected may be an economical material suitable to form the lens receptacle 150 while maintaining suitable optical properties, tolerances, heat management properties, or other properties. In another example, the material may be selected taking into consideration the cost of processing the material to form the lens receptacle 150. In yet another example, the material may be selected taking into consideration various aspects of producing optoelectronic subassemblies incorporating the lens receptacle 150 such as coupling or aligning the lens receptacle 150 with other components.

The lens receptacle 150 may be formed substantially or entirely of an economical material such as a plastic polymer or other suitable material. In such circumstances, all or some of the lens receptacle 150 may be optically transmissive. For example, at least the receptacle window 159 and individual lenses 157 may be transmissive. Alternatively, the lens receptacle 150 may be formed of an economical material, but some portions (such as portions related to the aperture 155, the lenses 157, the lens array 158 and/or the receptacle window 159) may be more optically transmissive than other portions. For example, the lens receptacle 150 may be formed of a plastic polymer with some optically transmissive portions and other dyed portions that may be opaque or at least less optically transmissive.

The lenses 157 may be integrally formed with the receptacle window 159 and/or the receptacle body 151 or coupled to the receptacle window 159 and/or the receptacle body 151 during or after its production. The receptacle body 151, the receptacle window 159 and the lenses 157 may be integrally formed by molding, machining, stamping, deposition or other suitable process. In some circumstances, integrally molding the lenses 157, the receptacle window 159, and the receptacle body 151 may contribute to cost-effective production of the lens receptacle 150.

If the lenses 157 are not integrally formed with the lens receptacle 150 and/or the receptacle window 159, they may be individually formed by molding, machining, stamping, deposition, any other suitable process or combination of such processes. Then, the lenses 157 may be coupled to the lens receptacle (e.g., the receptacle body 151 and/or the receptacle window 159) by fusing, soldering, adhesive, or by any other suitable coupling technique. Alternatively, if the lenses 157 are not integrally formed with the lens receptacle 150 or the receptacle window 159, they may be formed on the lens receptacle 150 (e.g., on the receptacle body 151 and/or the receptacle window 159) by deposition, printing, machining or other suitable process.

The lens receptacle 150 may be configured to interface with ferrule assemblies such as the ferrule assembly 250. Aspects of ferrule assemblies are described in further detail in U.S. Provisional Application 62/036,714, filed Aug. 13, 2014, entitled FERRULE ASSEMBLIES, and patent application Ser. No. 14/824,883, filed Aug. 12, 2015, entitled FERRULE ASSEMBLIES which are both incorporated by reference in their entirety. Aspects of one or both applications may be incorporated in the ferrule assemblies described in this application and/or the configurations of optoelectronic subassemblies.

Turning to FIGS. 7A-7B for example, the ferrule assembly 250 can include an upper portion such as an upper clamp member 254 configured to couple with the optical fibers 252 and a lower portion such as a lower clamp member 256 configured to couple with the optical fibers 252 and the upper clamp member 254. The upper and lower clamp members 254, 256 may be configured to retain the optical fibers 252 of corresponding optical cables 251 (which may be a single optical cable or a plurality of optical cables, such as ribbon optical cables) positioned between the upper and lower clamp members 254, 256. Accordingly, the upper and lower clamp members 254, 256 may cooperate to couple the optical fibers 252 between one another. In some aspects, the upper and lower clamp members 254, 256 may form a single integrally formed clamp member.

The optical cables 251 can include casings 258 surrounding at least a portion of the optical fibers 252. The casing 258 can be configured to insulate and/or guard the optical fibers 252. As illustrated, at least one or all of the optical fibers 252 can include a corresponding one of the casings 258. Additionally or alternatively, one of the casings 258 can surround more than one of the optical fibers 252 and/or can surround all of the optical fibers 252. As illustrated for example in FIG. 7B, a portion of each of the optical fibers 252 may be exposed from the casing 258 of the optical cables 251, and the optical fibers 252 are retained between the upper and lower clamp members 254, 256. In other examples, the upper and lower clamp members 254, 256 may retain the optical cables 251 by contacting the casings 258. The upper and lower clamp members 254, 256 can have various configurations and features that provide for a mechanism to clamp together with the optical fibers 252 held between.

A ferrule body 260 may surround at least a portion of the upper and lower clamp members 254, 256 and/or the optical fibers 252. The ferrule body 260 can be configured to hold the upper and lower clamp members 254, 256 together to clamp the optical fibers 252 between the upper and lower clamp members 254, 256. In some aspects, all of the ferrule body 260 and the upper and lower clamp members 254, 256 can contribute to holding the ferrule assembly 250 together and/or retaining the optical fibers 252.

The ferrule body 260 may include any suitable configuration (shape, position and/or dimensions), such as a rectangular configuration corresponding to the receptacle port 154. If the receptacle port 154 includes other configurations such as circular, the ferrule body 260 may include a corresponding configuration which may be circular. Additionally or alternatively, the upper and lower clamp members 254, 256 may include configurations (shape, position and/or dimensions) corresponding to the aperture 155.

Figure 2A:
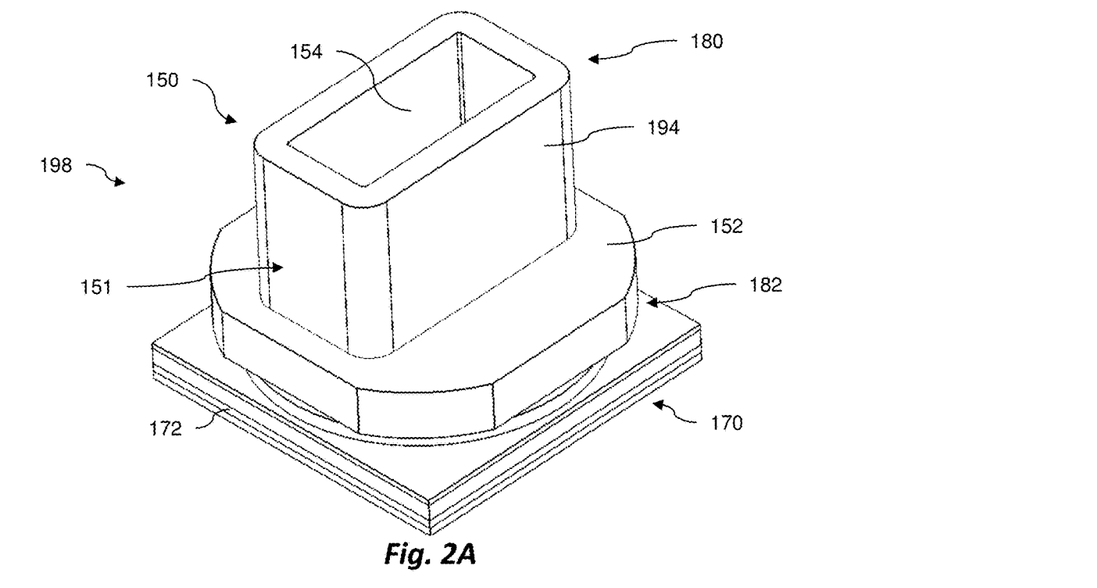
FIG. 2A is a perspective view of an optoelectronic subassembly.
Figure 2B:
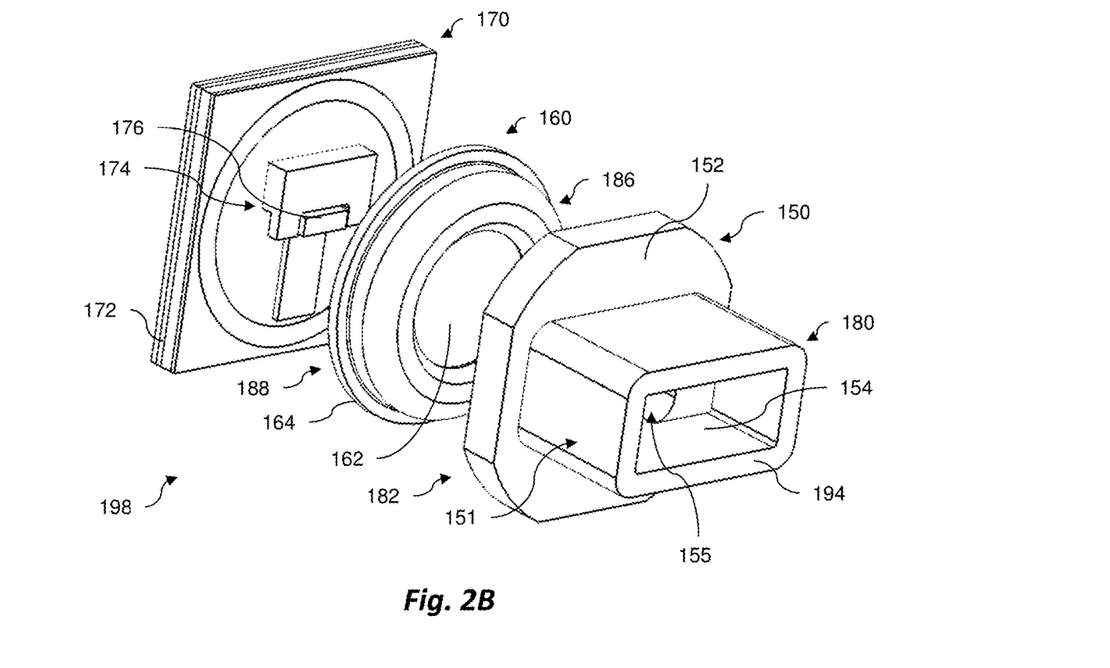
FIG. 2B is an exploded perspective view of the optoelectronic subassembly of FIG. 2A.

The ferrule assembly 250 may include multiple optical fibers 252, with each optical fiber configured to convey optical signals corresponding to at least one channel of a multi-channel optoelectronic subassembly, such as an optoelectronic subassembly 198 (see for example FIG. 2B), which will be described in further detail below. The optical fibers 252 may convey optical signals between a fiber optic network and the optoelectronic subassembly 198. As illustrated for example in FIG. 4, the ferrule assembly 250 may be positioned within the receptacle port 154 such that the optical fibers 252 interface (optically and/or physically) with the receptacle window 159 in the aperture 155.

The configuration (e.g., positioning and/or arrangement) of the lenses 157 and/or the lens array 158 and with respect to the receptacle window 159 and/or the receptacle body 151 may correspond to the configuration (e.g., positioning and/or arrangement) of the optical fibers 252 of the ferrule assembly 250, or vice versa. For example, the spacing between respective optical fibers 252 may be about the same (within acceptable tolerances) as the spacing between respective lenses 157. In another example, the optical fibers 252 may be arranged in a linear configuration that corresponds to a linear configuration of the lens array 158, or vice versa. In some circumstances, the linear configuration of the optical fibers 252 and/or the lens array 158 may facilitate economical production of the ferrule assembly 250, the lens receptacle 150, and/or the optoelectronic subassembly 198. In other configurations, the optical fibers 252 and/or the lens array 158 may include alternative configurations, some of which may facilitate economical production of the ferrule assembly 250, the lens receptacle 150, and/or the optoelectronic subassembly 198.

The ferrule assembly 250 may include the ferrule alignment features 266 that correspond to the receptacle alignment features 156. The ferrule alignment features 266 may be configured to interface with the receptacle alignment features 156. For example, the ferrule alignment features 266 may be configured to be inserted into the receptacle alignment features 156, or vice versa. In such configurations, the ferrule assembly 250 and the lens receptacle 150 may be aligned in at least one direction, such as being unidirectional, and may only fit in one orientation. When the ferrule alignment features 266 are inserted into the receptacle alignment features 156, the optical fibers 252 of the ferrule assembly may be aligned (within acceptable tolerances) with the lens array 158 such that optical signals are permitted to travel between the optical fibers 252, the lens array 158 and/or the header subassembly 170. An optoelectronic subassembly kit may include the ferrule assembly 250 with the ferrule alignment features 266 and a matching lens receptacle 150 with the receptacle alignment features 156.

In some configurations, when the ferrule alignment features 266 are inserted into the receptacle alignment features 156, the receptacle alignment features 156 and/or the ferrule alignment features 266 may permit the ferrule assembly 250 to be moved with respect to the lens receptacle 150. In such configurations, the receptacle alignment features 156 and/or the ferrule alignment features 266 may facilitate fine-tuning of the alignment between the lens receptacle 150 and the ferrule assembly 250 in at least one direction.

After the ferrule assembly 250 and the lens receptacle 150 are aligned with respect to one another, they may be coupled to one another. The ferrule assembly 250 and the lens receptacle 150 may be coupled to one another by fusing, soldering, adhesive, fasteners, or by any other suitable coupling technique. In some configurations, the receptacle alignment features 156 and/or the ferrule alignment features 266 may couple or contribute to coupling the ferrule assembly and the lens receptacle 150 to one another. Additionally or alternatively, the receptacle port 154 may couple or contribute to coupling the ferrule assembly 250 and the lens receptacle 150 to one another.

FIGS. 2A-2B and 3-4 illustrate an example of the optoelectronic subassembly 198 incorporating the lens receptacle 150. The optoelectronic subassembly 198 may include the housing 160 and the header subassembly 170. The header subassembly 170 may include any suitable aspects of U.S. Provisional Application 62/069,710 filed Oct. 28, 2014, entitled MULTI-LAYER SUBSTRATES and/or U.S. Provisional Application 62/069,712 filed Oct. 28, 2014, entitled SUBSTRATES INCLUDING OPTOELECTRONIC COMPONENTS, which are both incorporated by reference in their entirety.

The header subassembly 170 may include a multilayer substrate 172 and optoelectronic components 174 coupled to or formed on the multilayer substrate 172. The optoelectronic components 174 may include any suitable components that may be used in optoelectronic subassemblies such as TOSAs, ROSAs and/or other optoelectronic subassemblies. The optoelectronic components 174 may include drivers, monitor photodiodes, integrated circuits, inductors, capacitors, receivers, receiver arrays, control circuitry, lenses, laser arrays, or any suitable optoelectronic components. Although not illustrated, electrical lines may couple any of the optoelectronic components 174 to one another and/or to other components. In some configurations, the header subassembly 170 may include contact pads that permit electrical power and/or control signals to be conveyed to the optoelectronic components 174 or other components via the electrical lines. Additionally or alternatively, some of the optoelectronic components 174 may be optically coupled to one other.

The optoelectronic components 122 may include a lens 176. As illustrated, if the optoelectronic subassembly 198 includes a ROSA, the optoelectronic components 174 may include a receiver array 178 and the lens 176 may be configured to convey, direct and/or focus optical signals to the receiver array 178. In another example, if the optoelectronic subassembly 198 includes a TOSA, the optoelectronic components 174 may include a transmitter such as a laser, laser array driver circuitry, or optical components, and the lens 176 may be configured to convey, direct and/or focus optical signals from the transmitter. In some configurations, the optoelectronic subassembly 198 may include both a TOSA and a ROSA and the optoelectronic components 174 may include suitable components for both TOSAs and ROSAs.

The header subassembly 170 may be a multi-channel header subassembly and the optoelectronic components 174 may be configured to transmit, receive, direct, convey and/or focus multiple optical signals, each corresponding to one channel. If the header subassembly 170 is a multi-channel receiver subassembly, the receiver array 178 may be a multi-channel receiver array configured to receive multiple optical signals from corresponding optical fibers. In some configurations, the receiver array 178 may be configured to receive optical signals from four corresponding optical fibers, although other configurations are contemplated. If the header subassembly 170 is a multi-channel transmitter subassembly, the laser array may be a multi-channel laser array configured to transmit multiple optical signals to corresponding optical fibers. In some configurations, the laser array may be configured to transmit optical signals to four corresponding optical fibers, although other configurations are contemplated.

With reference to FIGS. 2A-2B and 3-4, the housing 160 will be described in further detail. In some configurations, the housing 160 may be configured to hermetically seal portions of the header subassembly 170 and/or the optoelectronic components 174. The housing 160 may extend between a housing top 186 and a housing bottom 188. The housing 160 may include a housing window 162 that may be at least partially optically transmissive. The housing window 162 may be configured to permit optical signals to travel between the lens receptacle 150 (e.g., the lenses 157) and the header subassembly 170 (e.g., the optoelectronic components 174) when the housing 160 is positioned there between. For example, in some configurations optical signals may travel from optical fibers, through the aperture 155 and the lens array 158 of the lens receptacle 150, then through the housing window 162 of the housing 160, though the lens 176 to the receiver array 178 of the header subassembly 170.

Figure 3:
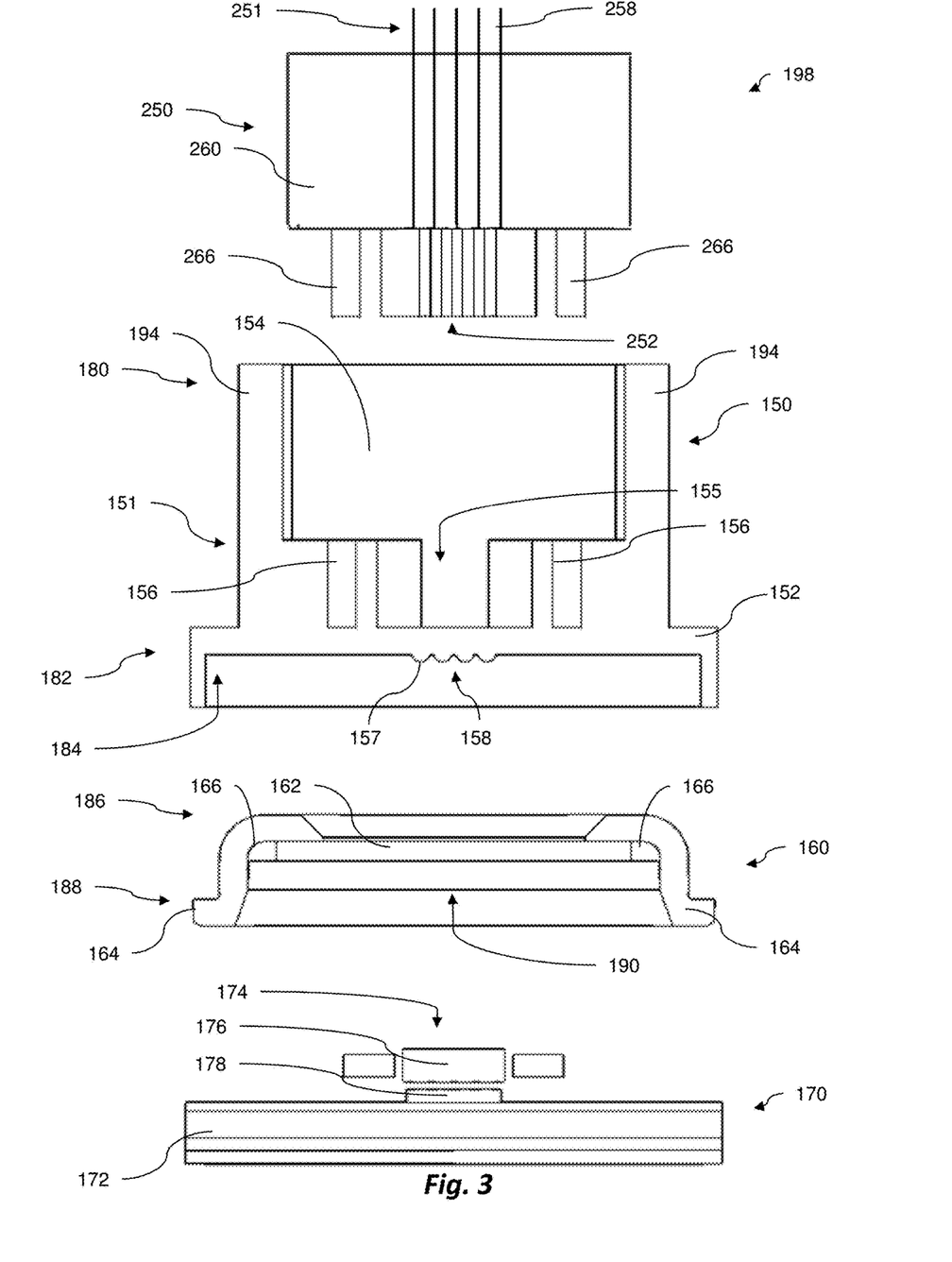
FIG. 3 is an exploded cross-sectional side view of the optoelectronic subassembly of FIG. 2A.
Figure 4:
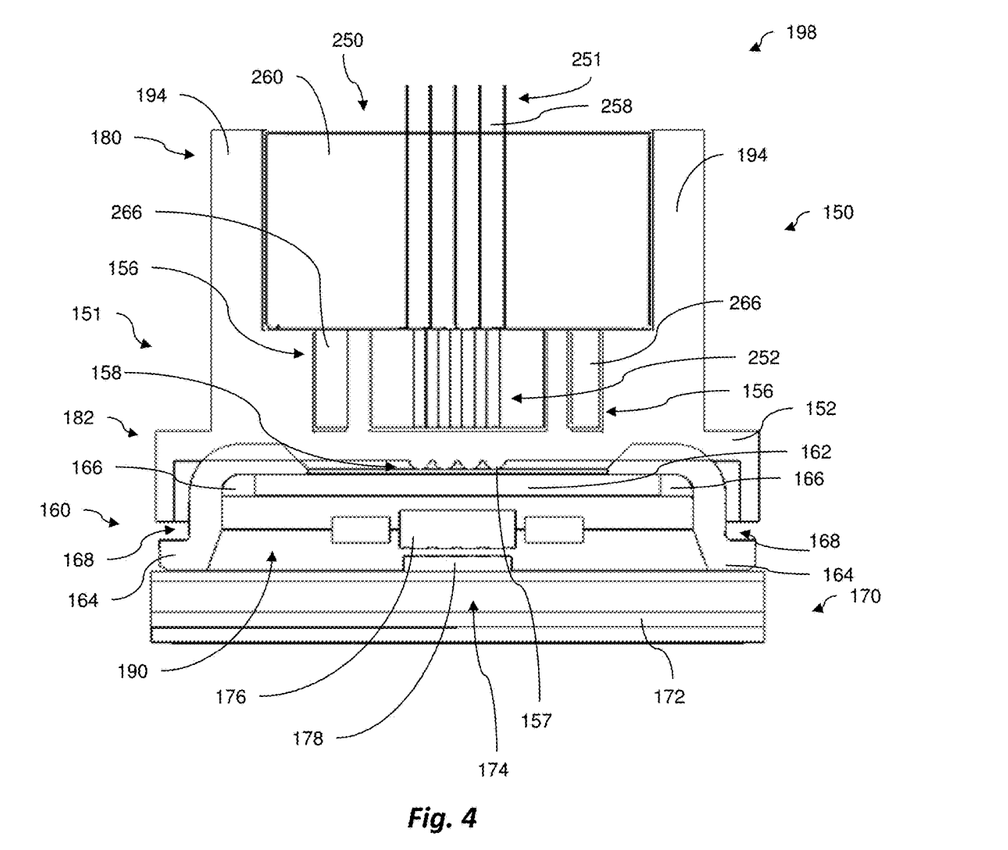
FIG. 4 is a cross-sectional side view of the optoelectronic subassembly of FIG. 2A.

The housing 160 may define a housing cavity 190 that may hermetically enclose portions of the header subassembly 170 and/or the optoelectronic components 174. The housing 160 may include a window seal 166 that may contribute to providing a hermetic seal between the housing 160 and the housing window 162. In addition to or instead of contributing to providing a hermetic seal, the window seal 166 may contribute to coupling the housing window 162 to the housing 160.

The housing bottom 188 may be configured (e.g., shaped and/or dimensioned) to interface with the header subassembly 170. The housing 160 may include a housing flange 164 positioned on the housing bottom 118. The housing flange 164 may be configured (e.g., shaped, dimensioned and/or positioned) to be coupled to a portion of the header subassembly 170. The housing 160 may be coupled to the header subassembly 170 by welding, soldering, glass soldering, adhesives, fasteners, fusing or any other suitable technique. The coupling between the housing 160 and the header subassembly 170 may contribute to hermetically sealing portions of the header subassembly 170 and/or the optoelectronic components 174.

The housing top 186 may be configured (e.g., shaped and/or dimensioned) to interface with the lens receptacle 150. As illustrated, the housing 160 may be substantially circular or annular, although in other configurations the housing 160 may be any suitable configurations such as rectangular. In such configurations, the header subassembly 170 and/or the lens receptacle 150 may include corresponding configurations to interface with the housing 160. As illustrated, the housing top 186 may include a circular configuration that corresponds to the circular configuration of the receptacle bottom 182. In alternative configurations, the housing top 186 and the receptacle bottom 182 may include corresponding rectangular or other suitable configurations.

As illustrated for example in FIG. 4, a portion of the housing 160 may be positioned within the receptacle cavity 184. The lens receptacle 150 and the housing 160 may be configured such that a spaced portion 168 permits the lens receptacle 150 to be positioned and/or aligned with respect to the housing 160. Specifically, the spaced portion 168 may permit the lens receptacle 150 to be moved with respect to the housing 160 until a desired position is reached. After positioning and/or alignment, a filler or adhesive may be positioned in the spaced portion 168 and/or between the housing 160 and the lens receptacle 150 to couple the housing 160 and the lens receptacle 150 to one another. In alternative configurations, housing 160 and the lens receptacle 150 may be coupled to one another with any suitable coupling technique. During positioning and/or alignment, the lens array 158 may be positioned and/or aligned with respect to the optoelectronic components 174, such that optical signals are conveyed and/or focused by the lenses 157 and travel to the receiver array 178 and/or the lens 176.

The housing 160 may be partially or entirely formed of any suitable material, for example metal. The material used to form the housing 160 may be selected to contribute to cost-effective production of the optoelectronic subassemblies incorporating the housing 160 such as the optoelectronic subassembly 198. For example, the material selected may be an economical material suitable to form the housing 160 while maintaining suitable characteristics, for example optical characteristics, tolerances, heat management characteristics, or other characteristics. In another example, the material may be selected taking into consideration the cost of processing the material to form the housing 160. In yet another example, the material may be selected taking into consideration various aspects of producing optoelectronic subassemblies incorporating the housing 160 such as coupling or aligning the housing 160 with other components. The housing 160 may be formed by molding, machining, stamping, deposition, printing or any suitable technique. For some configurations, the production technique may be chosen taking into consideration the cost of producing the housing 160 using that technique.

The housing window 162 may be formed partially or entirely of an optically transmissive material. For example, the housing window 162 may be formed partially or entirely of glass, plastic polymer, silicon compounds or other suitable materials. The housing window 162 may be formed by molding, machining, stamping, deposition or other suitable process. In some configurations, the housing window 162 may be integrally formed with the housing 160. In such configurations, the housing window 162 and the housing 160 may be formed of plastic polymer, glass or other suitable materials.

In alternate configurations, the housing 160 may include aspects of U.S. Provisional Application 62/063,225, filed Oct. 13, 2014, entitled MULTI-LENS OPTICAL COMPONENTS, which is incorporated by reference in its entirety. In such configurations, the lens receptacle 150 may not include the receptacle window 159, the lens array 158 and/or the lenses 157, and the housing window 162 may include a lens array with multiple lenses. In such configurations, each lens 157 may be configured to convey, direct and/or focus optical signals corresponding to one channel of the header subassembly 170.

Figure 5A:
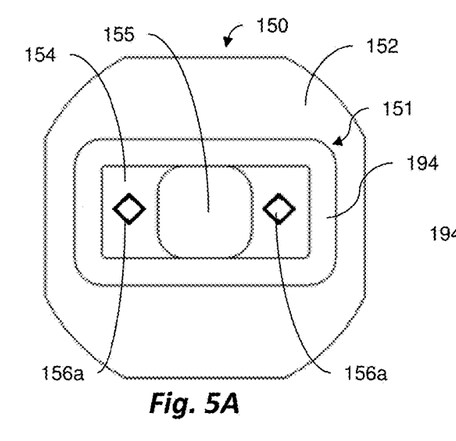
FIGS. 5A-5F are top views of lens receptacles.

FIGS. 5A-5F and 6A-6C illustrate alternative configurations of the lens receptacle 150. Although the receptacle alignment features 156 may be substantially circular as illustrated for example in FIG. 1D, the receptacle alignment features 156 may include any suitable geometric configuration. For example, FIG. 5A illustrates that receptacle alignment features 156a may be square or diamond-shaped. Furthermore, ferrule alignment features corresponding to the receptacle alignment features 156a may also be any suitable configuration that may interface with the receptacle alignment features 156a. For example, the receptacle alignment features 156a may interface with diamond-shaped or square ferrule alignment features. Additionally or alternatively, the receptacle alignment features 156a of FIG. 5A may interface with circular ferrule alignment features configured to be inserted into the receptacle alignment features 156a.

Figure 5B:
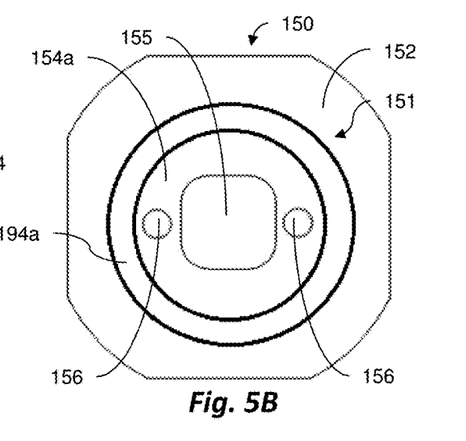

Although the receptacle port 154 may be rectangular, FIG. 5B illustrates that the receptacle port 154 may include any suitable geometric configuration. For example, in FIG. 5B the receptacle port 154a includes a circular configuration. As illustrated, the port body 194a that defines receptacle port 154a may include a circular configuration. Furthermore, the corresponding ferrule assembly may also be any suitable configuration that may interface with the receptacle port 154a.

Figure 5C:
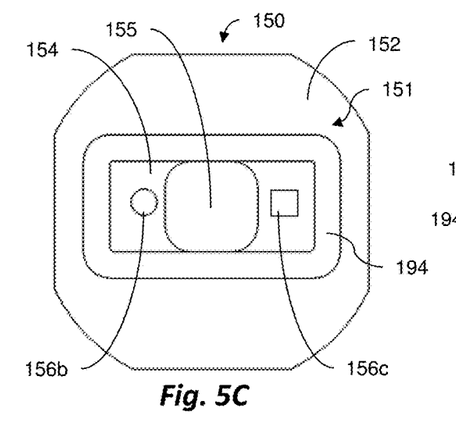

Although in some configurations the receptacle alignment features 156 may be symmetrical, FIG. 5C illustrates the lens receptacle 150 including asymmetrical receptacle alignment features 156b, 156c. In such configurations, the asymmetrical receptacle alignment features 156b, 156c may permit a corresponding ferrule assembly to be inserted into the receptacle port 154 in only one direction. Although the Figures illustrate the lens receptacle 150 with two receptacle alignment features 156, the lens receptacle 150 may include any number of the receptacle alignment features 156, including one or none at all.

Figure 5D:
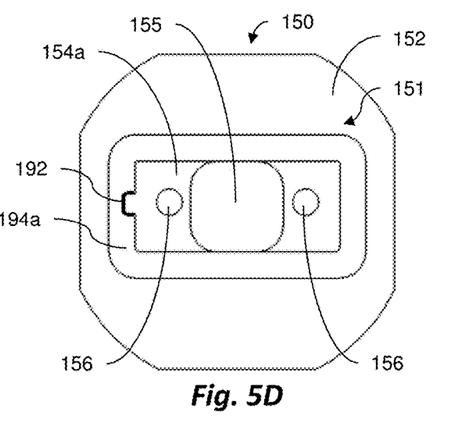

FIG. 5D illustrates the lens receptacle 150 including an asymmetric alignment feature 192. The asymmetric alignment feature 192 may permit a corresponding ferrule assembly to be inserted in only one direction. As illustrated, the asymmetric alignment feature 192 may be formed as part of the receptacle port 154a and/or the port body 194a. The asymmetric alignment feature 192 may be included in addition to or instead of the receptacle alignment features 156. In configurations where the asymmetric alignment feature 192 is included instead of the receptacle alignment features 156, the asymmetric alignment feature 192 may be configured to interface or facilitate aligning the corresponding ferrule assembly with the lens receptacle 150 and/or the header subassembly 170. In such configurations, the corresponding ferrule assembly may include a corresponding asymmetric ferrule alignment feature configured to interface with the asymmetric alignment feature 192. The asymmetric alignment feature 192 may be positioned in any suitable position on the port body 194.

Figures 5E, 5F:
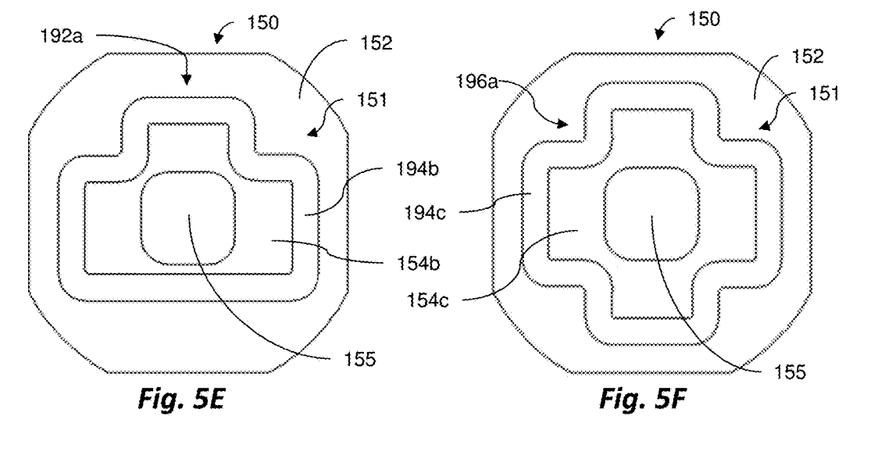

FIG. 5E illustrates the lens receptacle 150 including an alternative alignment feature 192a. As illustrated, the alignment feature 192a may be formed as part of a receptacle port 154b and/or a port body 194b. In such configurations, the corresponding ferrule assembly corresponding may include a corresponding ferrule alignment feature configured to interface with the alignment feature 192a.

FIG. 5F illustrates the lens receptacle 150 including an alternative alignment feature 196a. As illustrated, the alignment feature 196a may be formed as part of a receptacle port 154c and/or a port body 194c. The alignment feature 196a may be configured to interface or facilitate aligning the corresponding ferrule assembly corresponding with the lens receptacle 150 and/or the header subassembly 170. Here, one or more of the lobes of the receptacle port 154c may have a different size or shape. In such configurations, the corresponding ferrule assembly may include a ferrule alignment feature configured to interface with the alignment feature 196a. For example, the alignment feature 196a may be configured to receive a corresponding ferrule alignment feature to facilitate alignment of each of the lenses 157 with corresponding optical fibers of the ferrule assembly.

The lenses 157 of the lens receptacle 150 may be optically transmissive convex surfaces configured to convey, direct and/or focus optical signals. As illustrated for example in FIGS. 3 and 4, the lenses 157 may be positioned on one side of the receptacle body 151 and within the receptacle cavity 184. As illustrated for example in FIG. 6A, in other configurations a lens array 158a and a lenses 157a may be positioned on the other side of the receptacle body 151 in a position corresponding to the aperture 155, such as on the light receiving side of the receptacle window 159 for a ROSA or light transmitting side of the receptacle window 159 for a TOSA.

Figure 6A:
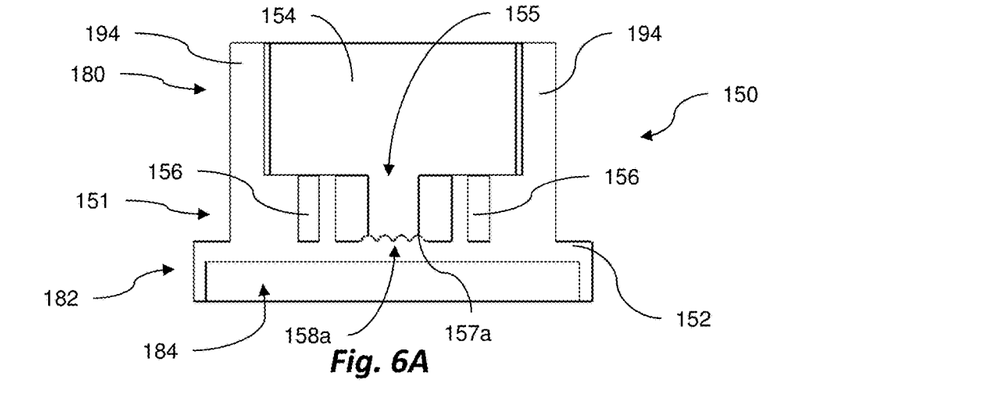
FIG. 6A is a cross-sectional side view of a lens receptacle.
Figure 6B:
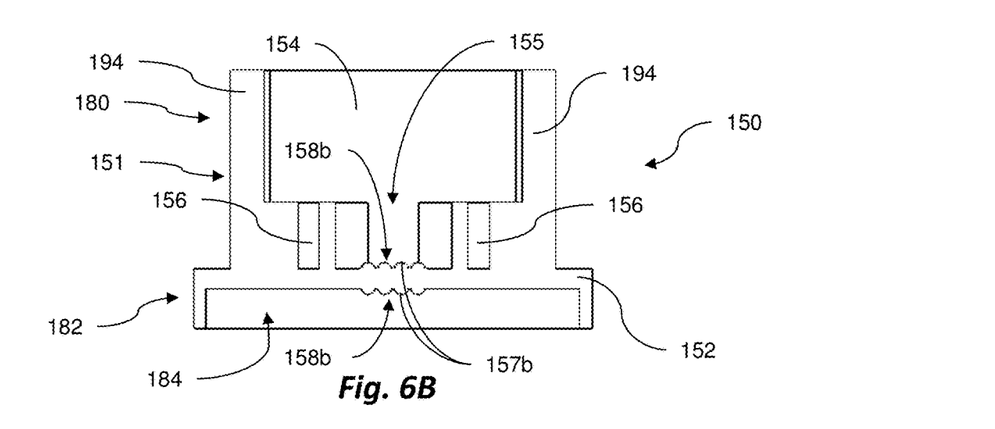
FIG. 6B is a cross-sectional side view of a lens receptacle.

As illustrated for example in FIG. 6B, in some configurations a lens array 158b may include lenses 157b positioned on two sides of the receptacle body 151, such as on both the light receiving and transmitting sides of the receptacle window 159. In such configurations, corresponding pairs of lenses 157b may both contribute to focusing and/or transmitting optical signals for one channel of a multi-channel optoelectronic subassembly. In such configurations, the lens receptacle 150 may have improved optical characteristics. In some circumstances, including the lens array 158b on both sides of the receptacle body 151 may increase the cost of the lens receptacle 150. For example, producing the lenses 157b on one side that align with corresponding lenses 157b on the other side may increase the cost of producing the lens receptacle 150 because the lenses 157b may be more difficult to align and/or because the lens receptacle 150 may require narrower tolerances.

Figure 1A:
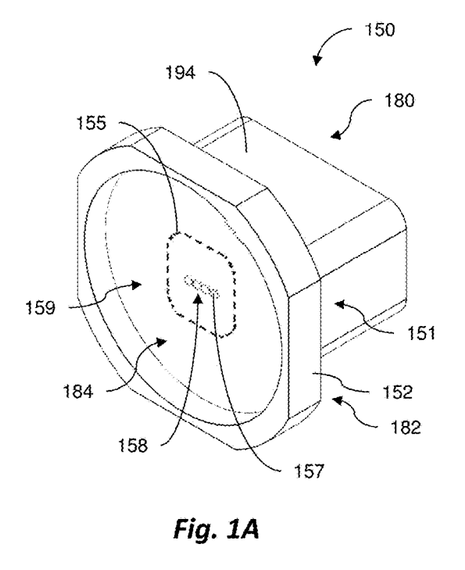
FIG. 1A is a perspective view of a lens receptacle.
Figure 1B:
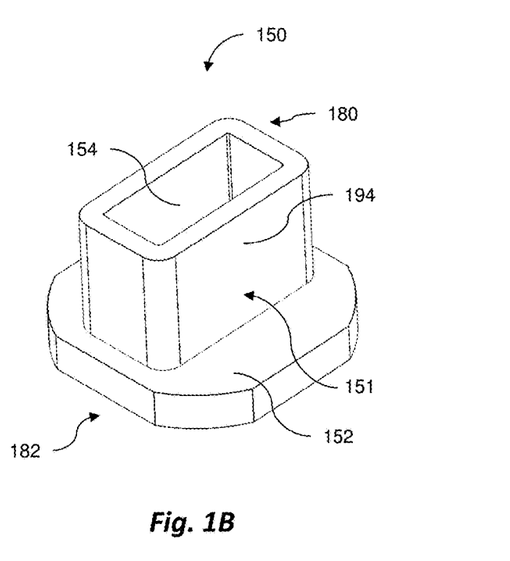
FIG. 1B is another perspective view of the lens receptacle of FIG. 1A.
Figures 1C, 1D:
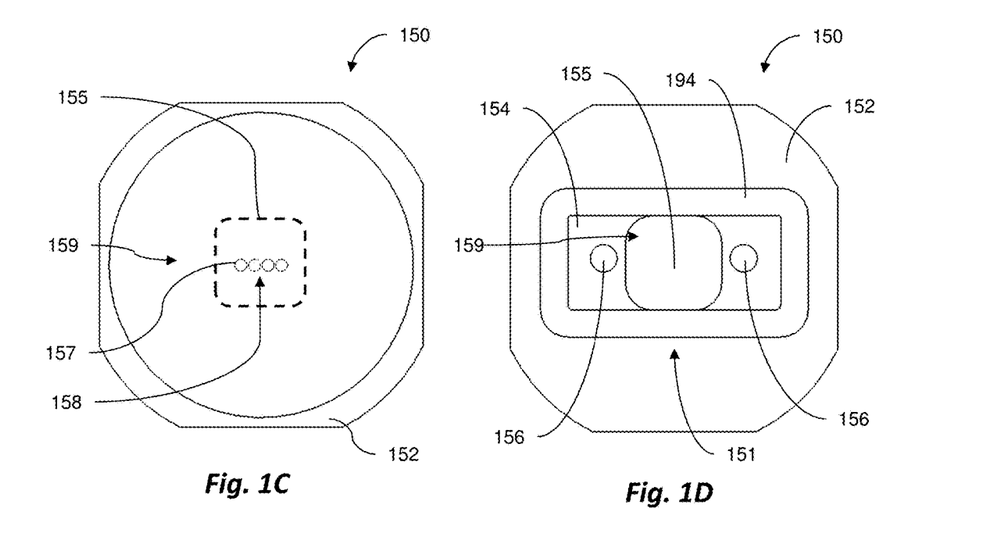
FIG. 1C is a bottom view of the lens receptacle of FIG. 1A.
FIG. 1D is a top view of the lens receptacle of FIG. 1A.
Figure 6C:
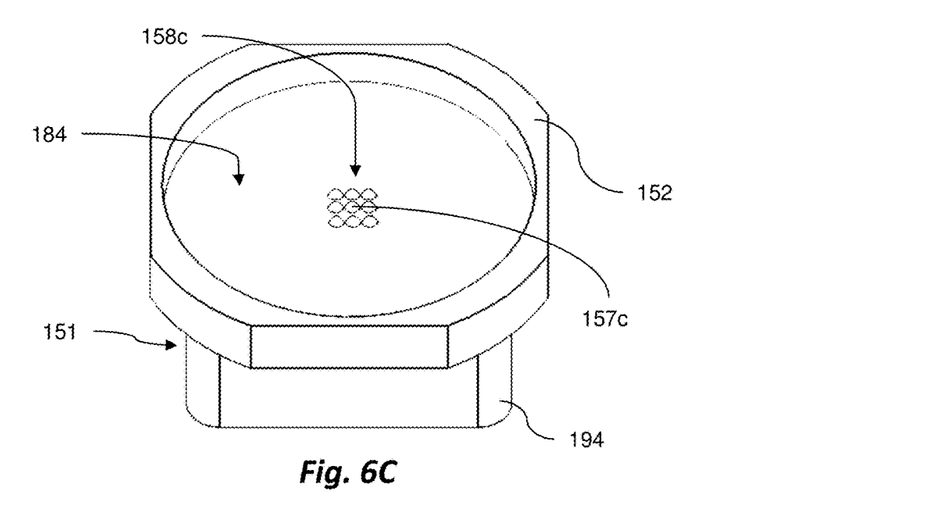
FIG. 6C is a perspective view of a lens receptacle.

The lens array 158 may include any suitable configuration of the lenses 157. For example, the lens array 158 may include a linear configuration as illustrated in FIGS. 1A and 1C. In some configurations a lens array 158c may include a square or rectangular configuration, as illustrated for example in FIG. 6C. The lens array 158 may include any suitable number of lenses. For example, FIGS. 1A and 1C illustrate the lens array 158 with four lenses 157 in a linear array. In another example, FIG. 6C illustrates the lens array 158c with nine lenses 157c in a grid array. As illustrated for example in FIG. 6B, the lens array 158b may include eight lenses 157b in a two-sided array. In such configurations, the corresponding pairs of lenses 157b may contribute to conveying, directing and/or focusing optical signals for one channel of a multi-channel optoelectronic subassembly. Any aspects of any of FIGS. 5A-5F and 6A-6C may be incorporated into the lens receptacle 150 and/or the configurations of the ferrule assembly 250, the housing 160, the header subassembly 170 and/or the optoelectronic subassembly 198.

In some configurations, a lens receptacle can include a receptacle body extending between a receptacle top and a receptacle bottom, the receptacle body can include: a port body defining a receptacle port with a port opening at the receptacle top; a receptacle window defining a base of the receptacle port; a lens array including lenses positioned on the window; and at least one receptacle alignment feature.

In some configurations, the lens receptacle can include a light aperture defined by the receptacle body and positioned within the receptacle port, and the light aperture can be configured to permit optical signals to travel through at least a portion of the lens receptacle to the lenses. In some configurations of the lens receptacle, the receptacle port can be rectangular. In some configurations the lens receptacle can include a receptacle base defining a receptacle cavity having a cavity opening at the receptacle bottom.

In some configurations of the lens receptacle the receptacle window can be an optically transmissive receptacle window occluding the light aperture. In some configurations of the lens receptacle, the receptacle window can be integral to the receptacle body or coupled to the receptacle body. In some configurations of the lens receptacle, the lenses can be integral with the receptacle window. In some configurations of the lens receptacle, the lenses can be separate members coupled to the receptacle window. In some configurations of the lens receptacle, the lens array can include a linear distribution such that the lenses are linearly aligned with respect to one another. In some configurations of the lens receptacle, the lens array can include a non-linear distribution of lenses.

In some configurations of the lens receptacle, the receptacle alignment feature can be unidirectional or asymmetrical. In some configurations of the lens receptacle, at least one receptacle alignment feature can be asymmetrical. In some configurations of the lens receptacle, at least one receptacle alignment feature can be substantially symmetrical. In some configurations of the lens receptacle, the receptacle alignment feature can be formed as part of the port body. In some configurations of the lens receptacle, the receptacle alignment feature can be defined by the receptacle body.

In some configurations of the lens receptacle, the lenses can be formed on the receptacle window by deposition, printing or machining. In some configurations of the lens receptacle, the lenses can be formed on the receptacle window by molding, machining, stamping or deposition and coupled to the lens receptacle. In some configurations of the lens receptacle, the lenses can be integrally formed with the receptacle window. In some configurations of the lens receptacle, the lens receptacle can be integrally formed by molding, machining, stamping, deposition or printing. In some configurations of the lens receptacle, at least a portion of the receptacle body can be formed of an optically transmissive material. In some configurations of the lens receptacle, the receptacle window can be optically transmissive at least where the lenses are positioned.

In some configurations of the lens receptacle, at least a portion of the receptacle body can be formed of a plastic polymer or glass. In some configurations of the lens receptacle, the entire lens receptacle can be formed of an optically transmissive material. In some configurations of the lens receptacle, the entire lens receptacle can be formed of a plastic polymer or glass. In some configurations of the lens receptacle, the receptacle window can be more optically transmissive at least where the lenses are positioned. In some configurations of the lens receptacle, the lenses can be optically transmissive convex surfaces. In some configurations of the lens receptacle, the lens array can include the lenses positioned on one side of the receptacle window. In some configurations of the lens receptacle, the lens array includes lenses positioned on two sides of the receptacle window.

In some configurations, an optoelectronic subassembly can include: a lens receptacle including a receptacle body extending between a receptacle top and a receptacle bottom, the receptacle body can include a port body defining a receptacle port at the receptacle top, a receptacle window defining a base of the receptacle port, a lens array including lenses positioned on the window, and at least one receptacle alignment feature; a multi-channel header subassembly; and a housing comprising a housing window that is at least partially optically transmissive.

In some configurations of the optoelectronic subassembly, the multi-channel header subassembly includes a multilayer substrate. In some configurations of the optoelectronic subassembly, the multi-channel header subassembly includes optoelectronic components coupled to or formed on the multilayer substrate (the optoelectronic components can be configured to transmit and/or receive multiple optical signals each corresponding to one channel). In some configurations of the optoelectronic subassembly, the optoelectronic components can include a receiver array configured to receive the multiple optical signals from corresponding optical fibers. In some configurations of the optoelectronic subassembly, the optoelectronic components can include a laser array configured to transmit the multiple optical signals to corresponding optical fibers.

In some configurations of the optoelectronic subassembly, the housing can hermetically seal the header subassembly when coupled to one another. In some configurations of the optoelectronic subassembly, the housing can hermetically seal the optoelectronic components when the housing is coupled to the header subassembly. In some configurations of the optoelectronic subassembly, the housing can include a housing top that can be shaped and dimensioned to interface with the lens receptacle. In some configurations of the optoelectronic subassembly, the housing can include a housing bottom that can be shaped and dimensioned to interface with the header subassembly. In some configurations of the optoelectronic subassembly, the housing can include a housing flange positioned on the housing bottom. In some configurations of the optoelectronic subassembly, a spaced portion between the housing and the lens receptacle can permit the lens receptacle to be positioned with respect to the housing. In some configurations of the optoelectronic subassembly, the housing can define a housing cavity.

In some configurations of the optoelectronic subassembly, the housing can be coupled to the header subassembly by welding, soldering, glass soldering, adhesives, fasteners, or fusing. In some configurations of the optoelectronic subassembly, the housing and the lens receptacle can be coupled to one another by filler or adhesive positioned between the housing and the lens receptacle. In some configurations of the optoelectronic subassembly, the housing can be at least partially formed of metal. In some configurations of the optoelectronic subassembly, the housing can be at least partially formed of a glass, plastic polymer or silicon compound.

In some configurations the optoelectronic subassembly can include a ferrule assembly including optical fibers (the ferrule assembly can be sized and shaped to be positioned inside the receptacle port). In some configurations of the optoelectronic subassembly, the optical fibers of the ferrule assembly are aligned with the lenses of the lens receptacle when the ferrule assembly is positioned inside the receptacle port. In some configurations of the optoelectronic subassembly, the ferrule assembly can include at least one ferrule alignment feature configured to interface with the receptacle alignment feature. In some configurations of the optoelectronic subassembly, the optical fibers of the ferrule assembly can be aligned with the lenses of the lens receptacle when the ferrule alignment feature interfaces with the receptacle alignment feature. In some configurations of the optoelectronic subassembly, the receptacle alignment feature can be unidirectional or asymmetrical.

In one example, a method can include providing a lens receptacle that can include a receptacle body extending between a receptacle top and a receptacle bottom, a port body defining a receptacle port, a receptacle window including a lens array of lenses positioned on the window, and at least one receptacle alignment feature; and providing a ferrule assembly that can include a ferrule body having upper and lower clamp members that retain optical fibers; and at least one ferrule alignment feature configured to interface with the receptacle alignment feature.

In some aspects the method can include inserting the ferrule assembly at least partially into the receptacle port. In some aspects the method can include interfacing the ferrule alignment feature and the receptacle alignment feature. In some aspects the method can include inserting the ferrule alignment feature into the receptacle alignment feature. In some aspects the method can include inserting the receptacle alignment feature into the ferrule alignment feature. In some aspects the method can include positioning the ferrule assembly so that the optical fibers are optically coupled with the lens array. In some aspects the method can include fixing the ferrule assembly and the lens receptacle.

In some aspects the method can include providing a housing including a housing window and a header subassembly having one or more optoelectronic components configured to transmit and/or receive optical signals, the housing window configured to permit optical signals to travel to and/or from the header subassembly. In some aspects the method can include positioning the housing over the header subassembly. In some aspects the method can include positioning the housing such that a housing flange of the housing is spaced apart from the header subassembly. In some aspects the method can include positioning the housing such that it permits optical signals to travel to or from the header subassembly.

In some aspects the method can include fixing the header subassembly and the housing. In some aspects the method can include fixing the header subassembly and the housing by soldering, fusing, welding, laser welding, adhering, or mechanical fastening. In some aspects the method can include fixing the header subassembly and the housing by soldering or laser welding. In some aspects the method can include hermetically sealing the header subassembly with the housing.

In some aspects the method can include transmitting optical signals through the housing window. In some aspects the method can include transmitting optical signals from at least one of the optical fibers and the optoelectronic component. In some aspects the method can include determining whether the ferrule assembly is optically aligned with the optoelectronic component. In some aspects the method can include determining a longitudinal, lateral, or rotational direction to move the ferrule assembly to optically align at least one of the optical fibers with the optoelectronic component. In some aspects the method can include positioning the ferrule assembly with respect to the header subassembly to optically align the ferrule assembly. In some aspects the method can include positioning the ferrule assembly with respect to the header subassembly such that at least one channel of optical signals travels to or from at least one of the optical fibers. In some aspects the method can include fixing the ferrule assembly and the housing to retain the position of the ferrule assembly with respect to the header subassembly. In some aspects the method can include fixing the ferrule assembly and the housing by soldering, fusing, welding, laser welding, adhering, or mechanical fastening. In some aspects the method can include fixing the ferrule assembly and the housing by soldering or laser welding.

In some configurations, a lens receptacle can include one or more of: a receptacle body extending between a receptacle top and a receptacle bottom, the receptacle body including a receptacle base defining a receptacle cavity positioned at or near the receptacle bottom (the receptacle base can be configured to interface with a housing); a port body defining a receptacle port at or near the receptacle top (the receptacle port configured to receive a ferrule assembly including optical fibers configured to convey optical signals corresponding to channels of a multi-channel subassembly); a lens array including lenses (the lenses can be configured to convey optical signals corresponding to the channels of the multi-channel subassembly); a receptacle alignment feature configured to receive a corresponding ferrule alignment feature of the ferrule assembly to facilitate alignment of the lens array with corresponding optical fibers of the ferrule assembly; an aperture defined by the receptacle body and positioned within the receptacle port (the aperture can be configured to permit optical signals to travel through at least a portion of the lens receptacle to the lenses); and an optically transmissive receptacle window occluding the aperture.

In some configurations, an optoelectronic subassembly can include one or more of: a lens receptacle including a receptacle body extending between a receptacle top and a receptacle bottom, the receptacle body including a port body defining a receptacle port at or near the receptacle top (the receptacle port can be configured to receive a ferrule assembly including optical fibers configured to convey optical signals corresponding to channels of a multi-channel subassembly), a lens array including lenses configured to convey the optical signals corresponding to the channels of the multi-channel subassembly, and a receptacle alignment feature configured to receive a corresponding ferrule alignment feature of the ferrule assembly to facilitate alignment of the lens array with corresponding optical fibers of the ferrule assembly; a multi-channel header subassembly comprising a multilayer substrate; and optoelectronic components coupled to or formed on the multilayer substrate (the optoelectronic components can be configured to transmit and/or receive multiple optical signals each corresponding to one channel).

In some configurations of the optoelectronic subassembly, the optoelectronic components include a receiver array configured to receive multiple optical signals from corresponding optical fibers. In some configurations of the optoelectronic subassembly, the optoelectronic components include a laser array configured to transmit multiple optical signals to corresponding optical fibers. In some configurations the optoelectronic subassembly can include a housing configured to hermetically seal the header subassembly when coupled to one another.

In some configurations the housing can include one or more of: a housing top configured to interface with the lens receptacle; a housing bottom configured to interface with the header subassembly; a housing window that is at least partially optically transmissive such that the housing window permits optical signals to travel between the lens receptacle and the header subassembly when the housing is positioned there between; and a housing cavity defined by the housing and configured to hermetically enclose portions of the header subassembly; a housing flange positioned on the housing bottom. In some configurations the housing and the lens receptacle can be configured such that a spaced portion permits the lens receptacle to be positioned with respect to the housing.

In some configurations, the housing can be coupled to the header subassembly by welding, soldering, glass soldering, adhesives, fasteners, or fusing. In some configurations, the housing and the lens receptacle can be coupled to one another by filler or adhesive positioned between the housing and the lens receptacle. In some configurations the housing can be at least partially formed of metal. In some configurations the housing can be at least partially formed of a glass, plastic polymer or silicon compound.

The present disclosure may be embodied in other specific forms without departing from its spirit or essential characteristics. The described examples are to be considered in all respects illustrative and not restrictive. The scope of this disclosure is indicated by the appended claims rather than by the foregoing description. All changes that come within the meaning and range of equivalency of the claims are to be embraced within their scope.

What is claimed is:

1. An optoelectronic subassembly comprising:
   a lens receptacle including a receptacle body extending between a receptacle top and a receptacle bottom, the receptacle body including:
      a port body defining a receptacle port at the receptacle top;
      a receptacle window defining a base of the receptacle port;
      a lens array including lenses positioned on the receptacle window; and
      at least one receptacle alignment feature;
   a multi-channel header subassembly optically coupled to the lens receptacle; and
   a housing positioned between the lens receptacle and the multi-channel header subassembly, the housing comprising a housing window physically separate from the receptacle window that is at least partially optically transmissive.

2. The optoelectronic subassembly of claim 1, wherein the multi-channel header subassembly further comprises:
   a multilayer substrate; and
   optoelectronic components coupled to or formed on the multilayer substrate, the optoelectronic components configured to transmit and/or receive multiple optical signals each corresponding to one channel;
   wherein:
      the optoelectronic components include a receiver array configured to receive the multiple optical signals from corresponding optical fibers; and/or the optoelectronic components include a laser array configured to transmit the multiple optical signals to corresponding optical fibers.

3. The optoelectronic subassembly of claim 2, wherein the housing hermetically seals the optoelectronic components when the housing is coupled to the header subassembly and the housing includes a housing top shaped and dimensioned to interface with the lens receptacle.

4. The optoelectronic subassembly of claim 3, wherein a spaced portion between the housing and the lens receptacle permits the lens receptacle to be positioned with respect to the housing.

5. The optoelectronic subassembly of claim 4, wherein the housing and the lens receptacle are coupled to one another by filler or adhesive positioned between the housing and the lens receptacle.

6. The optoelectronic subassembly of claim 1, further comprising a ferrule assembly including optical fibers, the ferrule assembly sized and shaped to be positioned inside the receptacle port such that the optical fibers of the ferrule assembly are aligned with the lenses of the lens receptacle when the ferrule assembly is positioned inside the receptacle port.

7. The optoelectronic subassembly of claim 6, the ferrule assembly further comprising at least one ferrule alignment feature configured to interface with the receptacle alignment feature, wherein the optical fibers of the ferrule assembly are aligned with the lenses of the lens receptacle when the ferrule alignment feature interfaces with the receptacle alignment feature.

8. The optoelectronic subassembly of claim 1, the lens receptacle further comprising a light aperture defined by the receptacle body and positioned within the receptacle port, the light aperture configured to permit optical signals to travel through at least a portion of the lens receptacle to the lenses.

9. The optoelectronic subassembly of claim 8, wherein the receptacle window is an optically transmissive receptacle window occluding the light aperture.

10. The optoelectronic subassembly of claim 1, wherein the lens array includes a linear distribution such that the lenses are linearly aligned with respect to one another.

11. The optoelectronic subassembly of claim 1, wherein at least a portion of the receptacle body is formed of an optically transmissive material.

12. The optoelectronic subassembly of claim 1, wherein the lenses are optically transmissive convex surfaces.

13. The optoelectronic subassembly of claim 1, wherein the lens array includes the lenses positioned on one side of the receptacle window.

14. The optoelectronic subassembly of claim 1, further comprising a receptacle base defining a receptacle cavity having a cavity opening at the receptacle bottom.

* * * * *